United States Patent [19]

Noto et al.

[11] Patent Number: 4,559,575
[45] Date of Patent: Dec. 17, 1985

[54] REMOVABLE DISK CARTRIDGE WITH IMPROVED DOOR OPERATING MECHANISM

[75] Inventors: Sal J. Noto, Cupertino; Robert P. Wartenbergh, Woodside, both of Calif.

[73] Assignee: Dysan Corporation, Santa Clara, Calif.

[21] Appl. No.: 443,770

[22] Filed: Nov. 22, 1982

[51] Int. Cl.$^4$ .............................................. G11B 23/02
[52] U.S. Cl. ..................................... 360/133; 360/132
[58] Field of Search ........................... 360/133, 97–99, 360/135, 132, 86; 206/444, 303, 309, 312; 346/137; 369/261, 270–271

[56] References Cited

U.S. PATENT DOCUMENTS

| | | | |
|---|---|---|---|
| 4,320,430 | 3/1982 | Vogt | 360/97 |
| 4,399,480 | 8/1983 | Edwards | 360/105 |
| 4,412,260 | 10/1983 | Stricklin et al. | 360/97 |
| 4,459,628 | 7/1984 | Barton | 360/133 |

Primary Examiner—Stuart N. Hecker
Assistant Examiner—David J. Severin
Attorney, Agent, or Firm—Townsend & Townsend

[57] ABSTRACT

An improved door slide operating mechanism consisting of a door slide with an operated end having a clevis link, a crank having a lower long journal received in a bored boss formed in the bottom portion of a disk cartridge casing and a short upper journal received in a bored boss formed in an upper casing portion, and a spring wound in tension about the lower journal boss and having a free arm biased against an operating end of the crank.

The mechanism is easily assembled by winding the spring about the boss, inserting a temporary holding pin into an additional boss formed in the bottom casing to provide a stop for the spring arm, engaging a forked end of a crank arm with the door slide clevis, inserting the long lower journal into its corresponding bore, and removing the temporary pin so that the free spring end bears against a stop provided on the crank arm.

4 Claims, 5 Drawing Figures

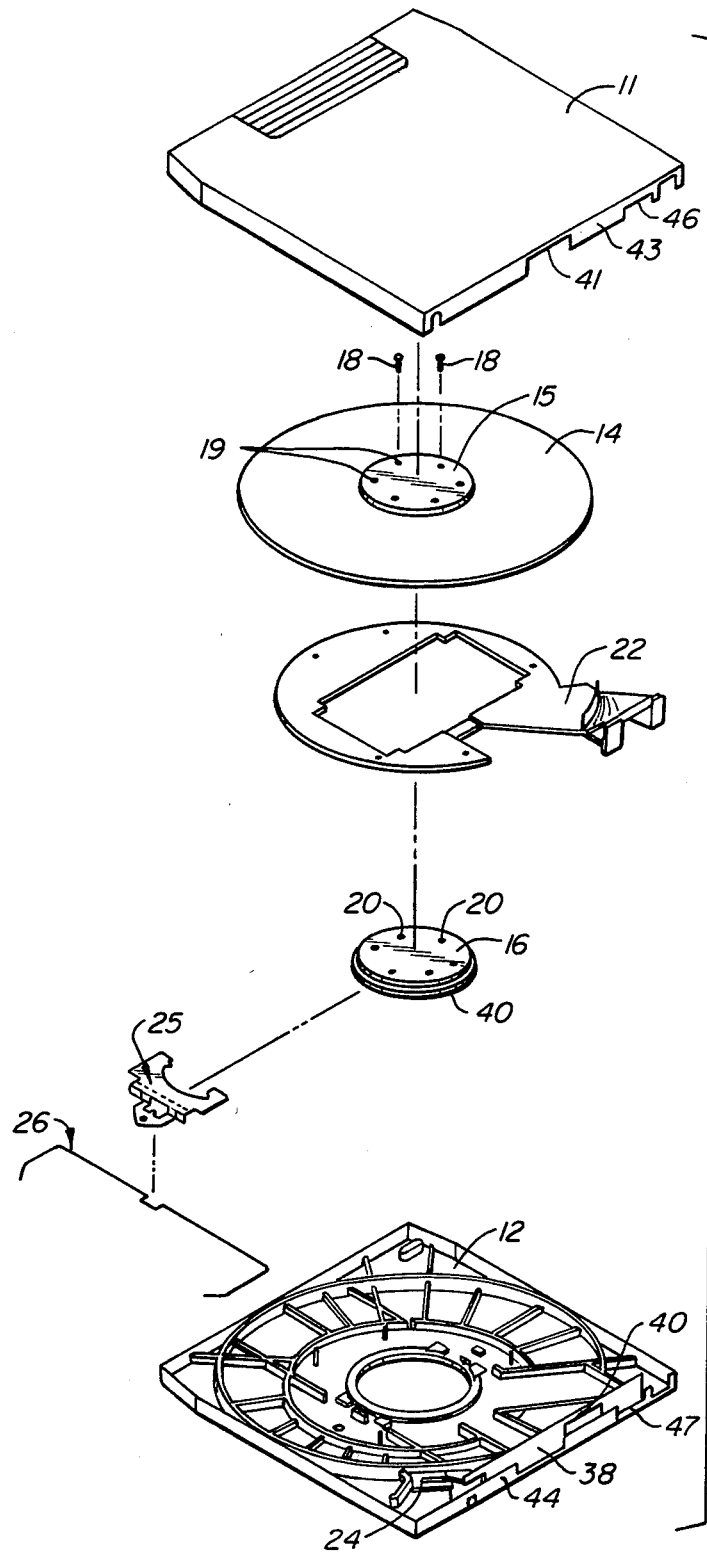
FIG._1.

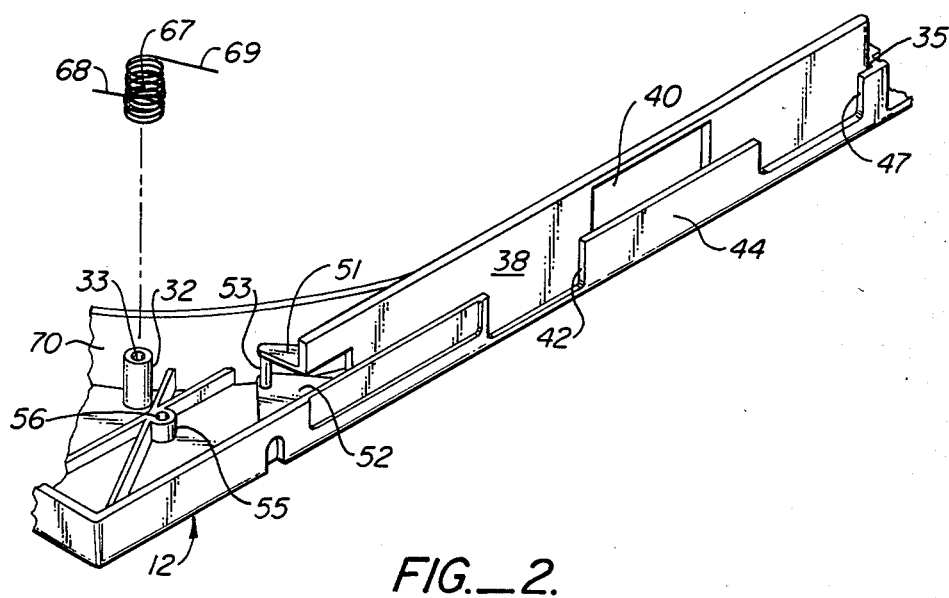
FIG._2.
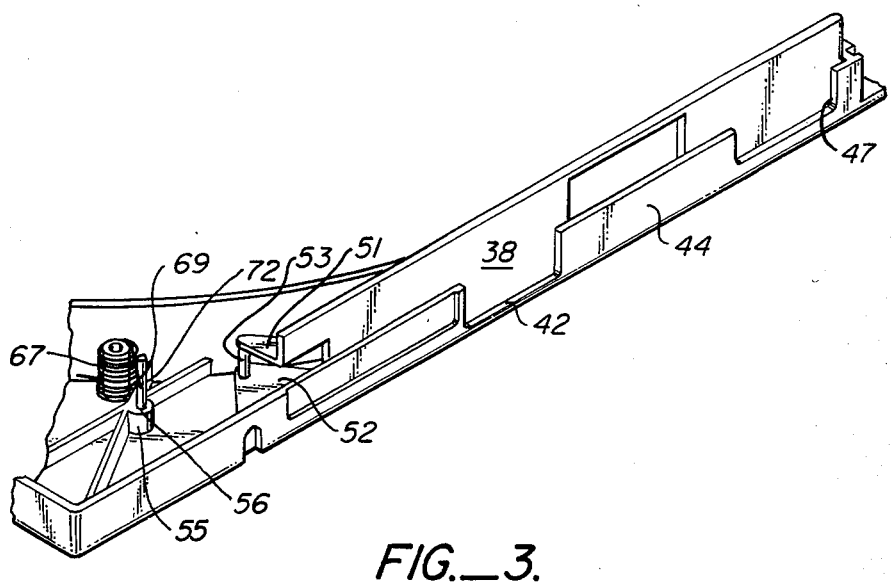
FIG._3.

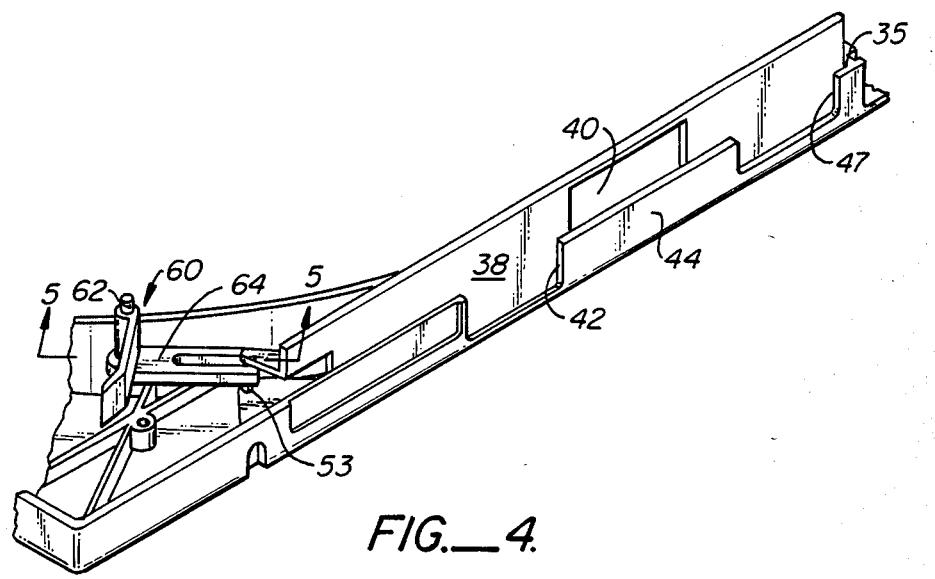
FIG._4.
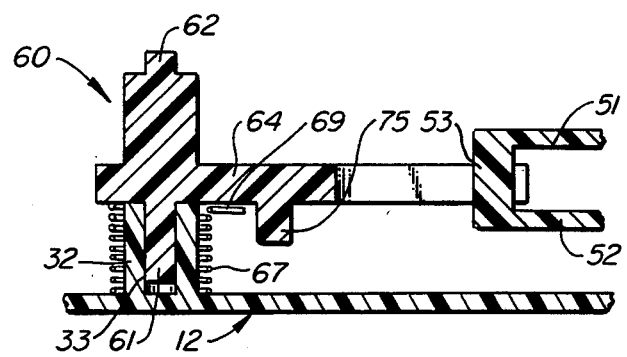
FIG._5.

REMOVABLE DISK CARTRIDGE WITH IMPROVED DOOR OPERATING MECHANISM

This invention relates to disk memory cartridges in general, and specifically to medium to small size disk memory cartridges adapted to be removably attached to an associated disk drive mechanism having a drive spindle.

Many current generation hard disk cartridges used in the data processing industry are designed to be removably attached to an associated disk drive unit. The removable disk cartridge typically includes a housing, a hard or rigid disk mounted within the housing, an externally accessible hub connected to the disk for enabling the disk to be rotated by an externally located drive spindle, and a normally closed door mechanism for providing access to the interior of the cartridge for the read/write transducers when the cartridge is inserted into the associated disk drive unit. The door mechanism is required to assist in sealing the interior of the disk cartridge from contaminants which otherwise could readily enter the interior of the cartridge and possibly damage the delicate disk recording surfaces.

The door mechanism typically comprises a door slide which is slidably received in a pair of slots formed in the access end of the top and bottom cartridge casing portions, and a spring loaded crank rotatably received in a pair of bored bosses formed on the inner surface of the top and bottom casing portions in facing relation. The door slide is usually provided with an integrally formed clevis at one end, and the crank typically has a forked operating end received on the clevis pin for pulling the door open and pushing it closed by sliding the door slide in the mounting slots in the proper direction. The crank has a second arm arranged at an angle with respect to the forked arm and positioned behind an access aperture in the access wall of the cartridge housing in such a position that the insertion of a crank retracting post into the aperture forceably rotates the crank against spring tension to open the door. The crank retracting post is fixed within the associated disk drive unit and is automatically inserted into the access aperture when the cartridge is installed in the drive. When the cartridge is removed from the drive, the spring tension causes the crank to rotate in the opposite direction, thereby sliding the door closed.

A disadvantage with door mechanisms of known design resides in the fact that the individual elements are rather difficult to assemble in production. Specifically, the pivot posts for the crank typically comprise two short integrally molded journals of the same axial length, each of which must be inserted into a corresponding bored boss, one in the top casing portion and the other in the bottom casing portion. It is frequently difficult to mate the two casing portions in such a manner that the journals are received in the bored bosses. To further compound the difficulty in assembling known door mechanisms, the torsion spring must be wound about the lower bored boss prior to the insertion of the lower crank pivot journal, which tends to tip the crank during assembly. It is also been found to be awkward to hold one end of the tension spring manually while inserting the lower crank pivot journal, and frequently the free end of the spring eludes the assembler.

SUMMARY OF THE INVENTION

The invention comprises an improved cartridge door mechanism which avoids the disadvantages noted above, may be easily assembled and is relatively simple in construction.

In a first aspect of the invention, an improved crank is provided which has a central body portion with coaxially arranged first and second journals serving as pivot posts, the bottom journal having a relatively longer axial length than the upper journal. The bored bosses formed on the inner surfaces of the top and bottom cartridge casing portions are correspondingly dimensioned so that the bored boss on the bottom casing portion inner surface has a relatively longer bore length to match the length of the first journal. When the first journal is inserted into its corresponding bored boss, the fit therebetween provides a very stable vertical alignment for the crank pin, even in the presence of the spring tension applied from the free arm of the crank tension spring. As a result, the crank is maintained substantially vertically and the upper bored boss may be fitted onto the upper journal in a relatively simple manner.

In a second aspect of the invention, an additional bored boss is provided on the bottom casing portion inner surface adjacent the crank journal boss and a separate removable pin is used as an aid in assembling the device.

A disk cartridge incorporating the invention is assembled by first placing a spring about the bottom casing portion bored boss with one end of the spring bearing against a fixed casing stop, after which the spring is wound about the bottom casing bored boss until the requisite spring tension has been achieved. Next, a pin is inserted into the additional bored boss and the free end of the spring is permitted to bear against this pin, thereby temporarily retaining the spring in the tensioned condition and freeing the operator to insert the lower crank journal into its corresponding boss. After the lower crank journal is received in the bored boss, the temporary pin is removed from the additional bored boss and the free end of the spring bears against a stop member formed on one of the crank arms. With the door slide in place, the cover can be attached to complete the assembly.

For fuller understanding of the nature and advantages of the invention, reference should be had to the ensuing detailed description, taken in conjunction with the accompanying drawings.

BRIEF DESCRIPTION OF THE DRAWINGS

FIG. 1 is an exploded perspective view illustrating the invention;

FIGS. 2–4 are sequentially arranged partial perspective views illustrating assembly of the invention; and FIG. 5 is a sectional view taken along lines 5—5 of FIG. 4 illustrating the construction of the crank arm and the spring placement.

DESCRIPTION OF THE PREFERRED EMBODIMENT

Turning now to the drawings, FIG. 1 shows an exploded perspective view of a disk cartridge assembly incorporating the invention. As seen in this Fig., a disk cartridge housing having a mating top casing 11 and a bottom casing 12 encloses a rigid disk assembly comprising a recording disk 14, an upper disc clamp 15 and a lower flange 16. Disk 14 is secured between disc clamp 15 and hub 16 by a plurality of fastener bolts 18 received through bores 19 in upper disc clamp 15 and threaded into tapped bores 20 in lower hub 16. The disk assembly is retained within the cartridge housing by means of a releasable hub locking mechanism which includes a pair of level plates 25 (only one of which is shown), a torsion spring 26 for each lever plate 25, and cooperating elements formed in the inner base surface of bottom casing 12. An airflow plate 22 is arranged to provide distribution of outside air within the disk cartridge when th disk is rotating.

A pair of mating bored bosses is provided, one each in top casing portion 11 and bottom casing portion 12 generally in a corner region thereof, the lower boss being designated with reference numeral 32, (FIG. 2) and the bosses being physically located so that their axes mate when the two half portions 11, 12 of the casing are assembled together. Each half casing portion 11, 12 is also provided with a laterally extending slot like lower slot 35, dimensioned to receive a door slide 38. Door slide 38 has a rectangular aperture 40 formed therein which is so located along the length of slide 38 as to provide registration with the transducer access opening when the slide is in the open position, the access opening being formed by u-shaped apertures 41, 42 formed in the front access wall of the cartridge defined by forward walls 43, 44. A second pair of u-shaped openings in access walls 43, 44 and designated by reference numerals 46, 47 provides an air inlet passage which is open for fluid communication with the mouth of air flow plate 22 when door slide 38 is moved to the open position.

On the left end of door slide 38 is a clevis member consisting of a pair of flanges 51, 52 joined by a clevis pin 53.

Also molded into bottom casing portion 12 is an additional bored boss 55 for a purpose to be described.

Door slide 38 is operated by means of a crank member generally designated by reference numeral 60 which is shown in section in FIG. 5. As seen in this Fig., crank 60 has a lower journal 61 and an upper journal 62. The length of lower journal 61 is substantially greater than that of upper journal 62 so that crank 60 is vertically stable when journal 61 is received in the bore 33 formed in boss 32.

With reference to FIGS. 2–4, assembly of the improved door slide operating mechanism proceeds as follows. A torsion spring 67 is placed over boss 32 with one end 68 thereof bearing against an abutment stop formed by a circular stiffener wall rib 70 (FIG. 2). Next, spring 67 is wound in the clockwise direction as viewed in FIG. 2 to provide a predetermined amount of spring tension. With the spring wound in tension, a temporary pin 72 is inserted into bore 56 of spare boss 55 and free arm 69 of spring 67 is permitted to bear against pin 72 (FIG. 3). This temporarily holds spring 67 under tension pending further assembly.

With reference to FIG. 4, crank 60 is maneuvered close to the boss 32 hidden from view and a forked end 64 is maneuvered into an embracing position with respect to door slide clevis pin 53 as shown. Thereafter, journal 61 is inserted into bore 33 to the position shown in section in FIG. 5, after which temporary pin 72 is removed, thereby releasing upper arm 69 of spring 67 to bear against the stop member 75 depending downwardly from crank arm 64. The assembly of the door operating mechanism is now complete and the cartridge assembly is finished in the usual manner.

As will now be appreciated, the improved door operating mechanism of the invention permits the assembly operation to be rapidly done without the need for any particular expertise. Specifically, by forming lower journal 61 with the extensive length illustrated, crank 60 cannot tip from the vertical when biased by upper arm 69 of spring 67. In addition, by providing the spare boss 55 and using the temporary pin 72, the spring tensioning step and the crank installation step are greatly simplified.

While the above provides a full and completed disclosure of the preferred embodiment of the invention, various modifications, alternate constructions and equivalents may be employed without departing from the true spirit and scope of the invention. Therefore, the above description and illustrations should not be construed as limiting the scope of the invention which is defined by the appended claims.

What is claimed is:

1. A door slide mechanism for a disk cartridge having a top and bottom casing portion with door slide grooves provided adjacent an access end, said mechanism comprising:

a pair of bored bosses each formed on a different inner surface of said top and bottom casing portions in spaced faced relation;

a door slide received in said slide grooves, said door slide having a free end and an operated end;

a crank having a central body portion with coaxially arranged first and second journal means serving as pivot posts, the first journal means having a sufficiently longer axial length than the second journal means for providing a vertically stable support for said crank when received in the bored boss of the bottom casing portion during assembly, said crank having a first operating arm coupled to said operated end of said door slide and a second operating arm arranged at an angle with respect to said first operating arm and adapted to rotate said crank in a first angular direction when operated by an associated member; and a torsion spring received about said bored boss of said bottom casing portion and held in tension by a fixed reference provided by one of said top and bottom casing portions and a reference stop carried by said crank.

2. The combination of claim 1 wherein said reference stop is carried by said first operating arm.

3. The combination of claim 1 wherein said reference stop is located on said first operating arm between the pivot axis of said crank and the outer end of said first operating arm.

4. The combination of claim 1 further including an additional bored boss formed on the inner surface of said bottom casing portion adjacent said first bored boss for temporarily receiving a spring fixture pin during assembly of said mechanism.

* * * * *